Figure 1:
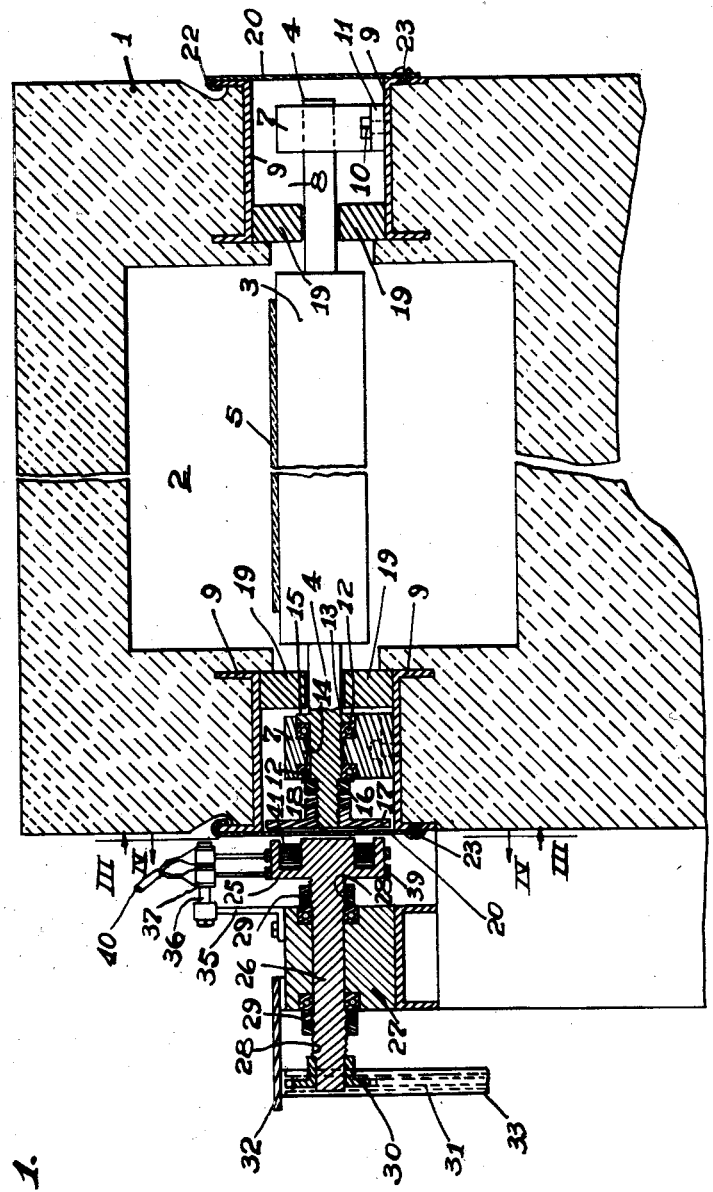

May 23, 1939.　　　E. A. FUSCA　　　2,159,657

MAGNETIC DRIVE FOR LEHR ROLLS

Filed Sept. 3, 1937　　　2 Sheets-Sheet 1

INVENTOR.
E. A. FUSCA
BY Bradley & Bee
ATTORNEYS.

May 23, 1939.  E. A. FUSCA  2,159,657
MAGNETIC DRIVE FOR LEHR ROLLS
Filed Sept. 3, 1937  2 Sheets—Sheet 2
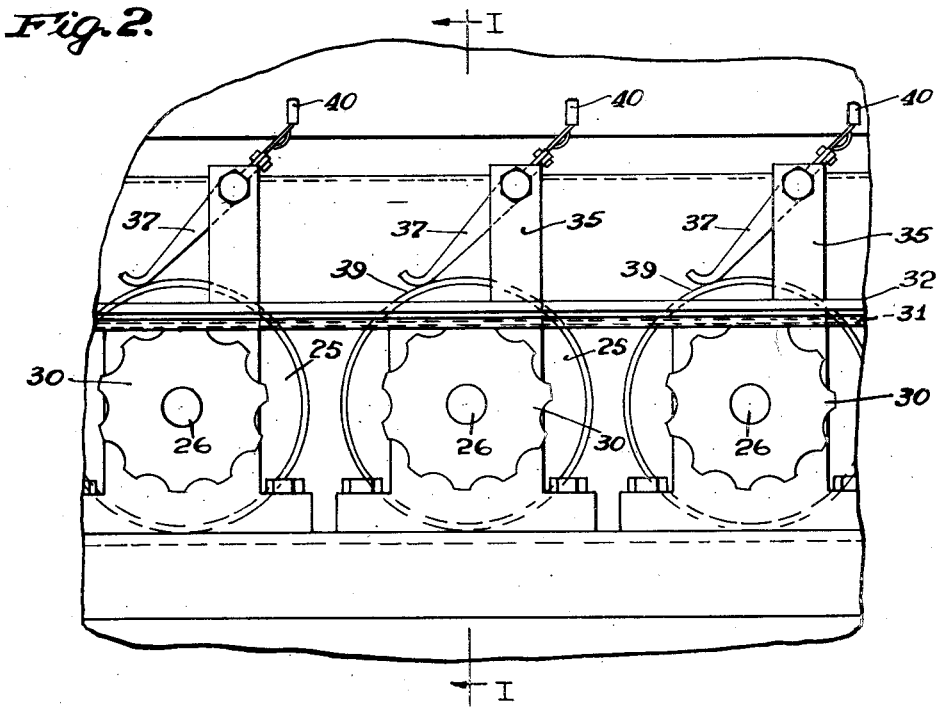
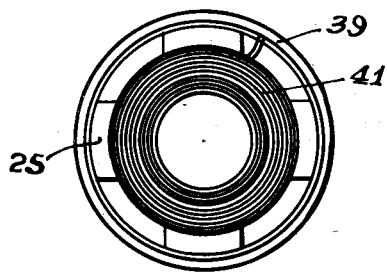
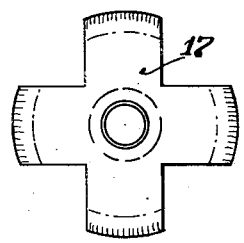
INVENTOR.
E. A. FUSCA
BY Bradley & Bee
ATTORNEYS.

Patented May 23, 1939

2,159,657

UNITED STATES PATENT OFFICE 2,159,657

MAGNETIC DRIVE FOR LEHR ROLLS

Emil A. Fusca, Perrysville, Pa., assignor to Pittsburgh Plate Glass Company, Allegheny County, Pa., a corporation of Pennsylvania Application September 3, 1937, Serial No. 162,281

3 Claims. (Cl. 49—47)

This invention relates to improvements in annealing lehrs and more particularly to a drive mechanism for operating the rolls which form a part of the lehrs particularly adapted for the annealing of glass sheets.

An object of the present invention is to provide a construction in which heat losses from the lehr will be reduced to a minimum.

Another object of the invention resides in the provision of an indirect drive for the lehr rolls, in order that the side walls may present a solid, unbroken surface.

A further object of my invention is to utilize a magnetic coupling between a driving mechanism maintained outside of the lehr and the lehr rolls which are positioned entirely within the lehr itself.

Other objects and advantages of the invention will become more readily apparent during the course of the following description of one embodiment of my apparatus.

Heretofore, in the construction of lehrs many attempts have been made to prevent undue heat losses through the roll driving mechanism. All of the attempts to overcome this disadvantage have been comparatively unsuccessful. It will at once be obvious that so long as the shafts of the lehr rolls project through the lehr walls, the heat necessary for successful annealing of glass sheets will be conducted through the metal shafts and rapidly dissipated. The various types of seals which have been proposed to surround the roll shafts will undoubtedly prevent heat losses through radiation and the admission of air current to the lehr; but they cannot prevent the conduction losses. These obvious disadvantages have been considered as necessary evils in connection with the many forms of annealing apparatus and workers skilled in the art have directed the major portion of their research to the development of baffle plates, special heaters and other appliances designed to counteract the unpreventable heat losses.

Briefly stated, applicant has by a single move eliminated not only heat losses through convection, but also those through conduction, while maintaining the radiation losses at a satisfactory minimum. The lehr rolls lie entirely within the lehr and no openings are required in the lehr walls for the projection of the roll shafts therethrough. The rolls are driven through the agency of electromagnets secured upon shafts disposed externally of the lehr and acting upon magnetic bodies, for example, permanent magnets carried by the roll shafts within the lehr through magnetic couplings, thus obviating the necessity of positive metallic couplings. A suitable diaphragm in the lehr wall between each electromagnet and its corresponding fixed magnet may then be employed to prevent objectionable heat losses through convection.

In the drawings wherein like numerals are employed to designate like parts throughout the same: Figure 1 is a sectional view of apparatus embodying my invention taken substantially on the line I—I of Figure 2; Figure 2 is a partial elevation thereof; Figure 3 is an enlarged view of one of the permanent magnets positioned within the lehr and Figure 4 is an enlarged view of the electromagnetic driving head.

Referring to the drawings, an annealing lehr 1 is constructed of refractory material and provided with a heated tunnel 2. A plurality of rolls 3 carried by the shafts 4 are mounted transversely of the tunnel 2 and serve to transport a glass sheet 5 therethrough in the annealing process. The mountings of each of these rolls and the apparatus through which it is driven are similar and therefore the following description is limited to one of the rolls.

The shaft 4 is mounted in bearings 7 which are positioned in suitable openings 8, provided in the walls of the lehr 1. The openings 8 are lined with flanged metallic plates 9 which are embedded in the refractory material forming the lehr walls. The bearings 7 are secured to the metallic plates 9 by any suitable means as the bolts 10 passing through flanges 11, forming the base of the bearing block, and engaging the metal plates 9. The bearings 7 are of the conventional type including races 12 and roller bearing rings 13 positioned upon opposite sides of the lands 14. The inner of these rings is maintained in position in the bearing 7 by a flange 15 formed integrally of the shaft 4.

One end of the shaft 4 is threaded to carry an adjusting nut 16 which serves to take up any play in the shaft occasioned by wear and to permit a satisfactory initial assembly. The opposite end of the shaft 4 is also provided with means (not shown) for permitting this adjustment of the shaft. A magnetic body 17, for example, a soft iron body, or a permanent magnet of cruciform shape is also mounted upon the threaded section of the shaft 4 with its face parallel to the line of the lehr wall, but spaced inwardly therefrom. A lock nut 18 secures the permanent magnet 17 upon the shaft 4 and permits adjustment thereof to enable the proper position of the magnet 17 to be maintained when it is necessary to adjust the relationship of the shaft 4 with the bearing 7. Blocks 19, of suitable insulating material, are positioned inwardly of the bearings 7 and seal the openings 8 from communication with the lehr tunnel 2. Cover plates 20 are secured over the openings 8 and seal said openings from communication with the atmosphere. The cover plates 20 are preferably of a non-magnetic material such as stainless steel, but any light material could be used without destroying the efficacy of the drive mechanism. The cover plates 20 are provided with an overlying flange section 22 extending along the upper edge thereof, which engages the outer flange of the metallic plate 9 and screws 23 are employed to fasten the lower edge of the cover plates 20 over the openings 8.

Rotation of the roll 3 is accomplished through the medium of an electromagnet 25 secured to the shaft 26 which shaft lies externally of the lehr along the same axis as the shaft 3. The shaft 26 is mounted in a bearing 27 and is threaded along sections 28 upon opposite sides of the bearing 27 to permit lateral adjustment thereof. Lock nuts 29 engaging the threaded sections 28 serve to maintain the proper position of the shaft 26 in the bearing 27. By suitable operation of the nuts 29, the shaft 26 may be shifted in order that the magnet 25 may be brought into closer relation with the permanent magnet 17. Also mounted on the shaft 26 is a sprocket wheel 30 which engages a chain 31 driven by a motor (not shown) or any other suitable means. A guard plate 32 secured to the bearing block 27 covers the sprocket wheel 30 and also carries a guard 33 to cover the chain drive. A bracket 35 mounted upon the bearing block 27 carries an arm 36 which serves as a support for brushes 37, contacting the collector rings 39 of the electromagnet 25. A cable 40 is connected to the brushes 37 to supply current for the activation of a coil 41 forming a part of the magnet 25.

In operation, the electromagnets 25 are brought into proper register with the permanent magnets 17 and energized by an electric current. The electromagnets 25 are rotated and the magnetic flux emanating therefrom produces rotation of the permanent magnet 17, the shafts 4 and the rolls 3 whereby the glass sheet 5 is advanced through the lehr tunnel 2.

It is to be understood that this magnetic drive may also be installed upon both sides of the lehr in order to secure a more efficient drive in the event such action is necessary. Other changes in the arrangement of the various parts of my invention as shown and described in this embodiment thereof may be resorted to without departing from the spirit of the invention or the scope of the appended claims.

What I claim is:

1. The combination with a lehr construction including a plurality of horizontal rolls for carrying work therethrough, of means for driving the rolls indirectly comprising a magnetic member secured to each driven roll at the end thereof and disposed within a suitable housing in the lehr wall with the face adjacent the outer surface of the lehr wall, a cover plate positioned over the housing, and a magnet spaced from the cover plate and mounted outside of the lehr wall in coaxial alignment with the roll, the magnet being rotatable to drive the magnetic member and the roll upon which it is secured.

2. In combination in a lehr construction including a heated tunnel formed of refractory material, a plurality of rolls lying transversely of said tunnel in a horizontal plane, shafts for the rolls mounted on bearings located in suitable housings in the lehr walls, insulating members surrounding the shafts inwardly of the bearings and substantially sealing the housings in the lehr walls from the tunnel, a fixed magnetic member secured to one end of each shaft carrying the rolls, lying within the housing in the lehr wall with its face adjacent the outer surface of the lehr wall, a non-magnetic cover plate secured to the outer surface of the lehr wall positively sealing the housing provided therein for the roll shaft, and an electromagnet spaced from the cover plate and mounted outside of the lehr wall along the axis of the roll, the electromagnet being rotatable to drive the fixed magnetic member and the shaft upon which it is secured.

3. In combination in a lehr construction including a heated tunnel formed of refractory material, a plurality of rolls lying transversely of the tunnel in a horizontal plane, shafts for the rolls mounted on bearings located in suitable housings in the lehr walls, insulating members surrounding the shafts inwardly of the bearings and substantially closing the housings in the lehr walls from communication with the tunnel, a permanent magnet of cruciform shape adjustably secured to one end of each roll carrying shaft, lying within the housing in the lehr wall with its face substantially in the vertical plane of the outer surface of the lehr wall, a non-magnetic plate secured to the outer surface of the lehr wall over each housing therein sealing the housings from communication with the atmosphere, the cover plates being spaced from the permanent magnets, and electromagnets spaced from the cover plates and adjustably mounted outside of the lehr wall in close proximity to each of the permanent magnets along the same axis of the rolls, the electromagnets being rotatable to drive the permanent magnets and the shafts to which they are secured.

EMIL A. FUSCA.